United States Patent
Ramaswamy

(10) Patent No.: US 7,529,846 B2
(45) Date of Patent: May 5, 2009

(54) VIDEO RECEIVER ARCHITECTURE FOR DIGITAL SUBSCRIBER LINE NETWORKS

(75) Inventor: Kumar Ramaswamy, Plainsboro, NJ (US)

(73) Assignee: Thomson Licensing, Boulogne Billancourt (FR)

( * ) Notice: Subject to any disclaimer, the term of this patent is extended or adjusted under 35 U.S.C. 154(b) by 574 days.

(21) Appl. No.: 10/144,880

(22) Filed: May 14, 2002

(65) Prior Publication Data

US 2003/0217368 A1 Nov. 20, 2003

(51) Int. Cl.
*G06F 15/16* (2006.01)
(52) U.S. Cl. .................. 709/231; 709/238; 709/246; 709/203; 370/395.1
(58) Field of Classification Search ................ 709/231, 709/246–247, 230, 203, 238; 725/131, 117; 370/395.1, 352
See application file for complete search history.

(56) References Cited

U.S. PATENT DOCUMENTS

| | | | |
|---|---|---|---|
| 5,928,331 A | | 7/1999 | Bushmitch |
| 5,941,951 A | | 8/1999 | Day et al. |
| 5,991,292 A | * | 11/1999 | Focsaneanu et al. ........ 370/352 |
| 6,130,879 A | * | 10/2000 | Liu ............................ 370/230 |
| 6,263,371 B1 | | 7/2001 | Geagan, III et al. |
| 6,424,657 B1 | * | 7/2002 | Voit et al. ................... 370/412 |
| 6,603,850 B1 | * | 8/2003 | Stahl et al. .................. 370/389 |
| 6,640,239 B1 | * | 10/2003 | Gidwani ..................... 709/203 |
| 6,714,516 B1 | * | 3/2004 | Todd ........................... 370/235 |
| 6,728,367 B1 | * | 4/2004 | Swam ........................ 379/372 |
| 6,782,097 B2 | * | 8/2004 | Witty et al. ............ 379/399.01 |
| 6,829,252 B1 | * | 12/2004 | Lewin et al. ................. 370/493 |
| 6,891,825 B1 | * | 5/2005 | O'Dell et al. ............... 370/352 |
| 6,898,210 B1 | * | 5/2005 | Cheng et al. ................ 370/480 |
| 7,003,052 B2 | * | 2/2006 | Koike ......................... 375/316 |
| 2002/0004935 A1 | * | 1/2002 | Huotari et al. ................ 717/11 |
| 2002/0034220 A1 | * | 3/2002 | Duxbury ..................... 375/222 |
| 2002/0095484 A1 | * | 7/2002 | Pagani et al. ................ 709/220 |
| 2002/0128009 A1 | * | 9/2002 | Boch et al. .................. 455/426 |
| 2002/0159462 A1 | * | 10/2002 | Demaria et al. .......... 370/395.1 |
| 2003/0039335 A1 | * | 2/2003 | Pharoah et al. ................ 379/22 |

* cited by examiner

*Primary Examiner*—Philip B Tran
(74) *Attorney, Agent, or Firm*—Robert D. Shedd; Robert B. Levy; Jeffrey D. Hale

(57) ABSTRACT

A customer-side receiver unit and method include a network interface module for receiving multiplexed information in the form of one or more of voice, audio, visual and data from a head-end network. A transport layer termination entity terminates layers of protocol associated with the information. A transport converter is coupled to the transport layer termination entity to convert streaming data in the information to a format usable by a local network. A dedicated stream port is coupled to the transport converter to output the streaming data content to the local network.

19 Claims, 5 Drawing Sheets

VIDEO RECEIVER ARCHITECTURE FOR DIGITAL SUBSCRIBER LINE NETWORKS

FIELD OF THE INVENTION

The present invention generally relates to network communications and, more particularly, to a receiver architecture which permits bypassing of a termination device at a customer's location for streaming content to permit home networking.

BACKGROUND OF THE INVENTION

Video on demand (VoD), audio on demand and other streaming data transfer applications are emerging technologies for home entertainment service businesses. For example, a VoD service permits a customer to request a video in real-time from a large collection of videos stored on a server located in a remote facility. Video transfer can be provided over a network system, such as a telephone system or a cable network, for example. A sufficient amount of bandwidth must be available however to continuously transfer the data from a storage system to the customer's equipment. The amount of bandwidth between a video server and the customer's equipment ultimately determines the maximum number of simultaneous video streams the server can support at any given time.

One key communication transmission technology that is enabling transformation of existing public information networks to accommodate higher bandwidth needs is Asymmetric Digital Subscriber Line (ADSL), a modem technology. ADSL converts existing twisted-pair telephone lines into access paths for multimedia and high-speed data communications. ADSL rates expand existing access capacity by a factor of, say, 50 or more without new cable installations.

ADSL technology involves modems attached across twisted pair copper wiring in which higher transmission rates can be achieved. When content is received in a home, a termination device is needed to terminate these different protocols. Streaming data, for example video, is separated out to be used by a subscriber. Streaming data is transferred directly to the device, which uses the streaming data. The prior art does not address home networks or networking streaming data to more than one unit a given time.

Therefore a need exists, a receiver architecture that permits an end terminal device to be decoupled from an access network device to provide greater flexibility for implementing a home network. A further need exists for a system for a controllable user interface to permit the decompression of streaming data at the customer access device to permit access to multiple devices in a network.

SUMMARY OF THE INVENTION

A customer-side receiver unit and method include a network interface module for receiving multiplexed information in the form of one or more of voice, audio, visual and data from a head-end network. A transport layer termination entity terminates layers of protocol associated with the information. A transport converter is coupled to the transport layer termination entity to convert streaming data in the information to a format usable by a local network. A dedicated stream port is coupled to the transport converter to output the streaming data content to the local network.

A method for providing a data stream to a plurality of devices in a local network, such as a home network, by transport from a head-end network, includes providing a customer-side receiver unit in accordance with the present invention. Streaming data content is received from the head-end network and converted to a format compatible with a local network. The streaming data content is distributed to a plurality of devices on the local network for simultaneous use by the plurality of devices.

BRIEF DESCRIPTION OF THE DRAWINGS

The advantages, nature, and various additional features of the invention will appear more fully upon consideration of the illustrative embodiments now to be described in detail in connection with accompanying drawings wherein.

It should be understood that the drawings are for purposes of illustrating the concepts of the invention and are not necessarily the only possible configuration for illustrating the invention.

DETAILED DESCRIPTION OF THE INVENTION

The present invention provides an interface, which permits local networking of data stream content. A data stream may be sent to a subscriber of an access network through an asynchronous transfer mode switched network or a through a TCP/IP based network. The present invention provides a transport converter which is preferably located at a receiver decoder, but may be employed at other locations in the network, to permit a data stream by converted (e.g., decompressed) and employed by a plurality of locally disposed devices. The transport converter advantageously provides an interactive conversion interface between an access network termination (e.g., a customer premise device (CPE)) and a local network transport interface (e.g., a set top box). In this way, streaming data is converted for distribution onto a local network, such as a home network, so that the streaming data is concurrently available at many devices in the local network.

It is to be understood that the present invention is described in terms of a video-on-demand (VoD) system; however, the present invention is much broader and may include any digital multimedia documents, for example, audio documents, which are capable of delivery over a switched network. In addition, the present invention is applicable to any system ordering method including orders taken by telephone, set top boxes, computer, satellite links, etc. The present invention is described in terms of a DSL network; however, the concepts of the present invention may be extended to cable, wireless or other network types using ATM and/or Internet Protocol (IP) technology.

It should also be understood that the elements shown in the FIGS. may be implemented in various forms of hardware, software or combinations thereof. Preferably, these elements are implemented in a combination of hardware and software on one or more appropriately programmed general-purpose devices, which may include a processor, memory and input/output interfaces.

Figure 1:
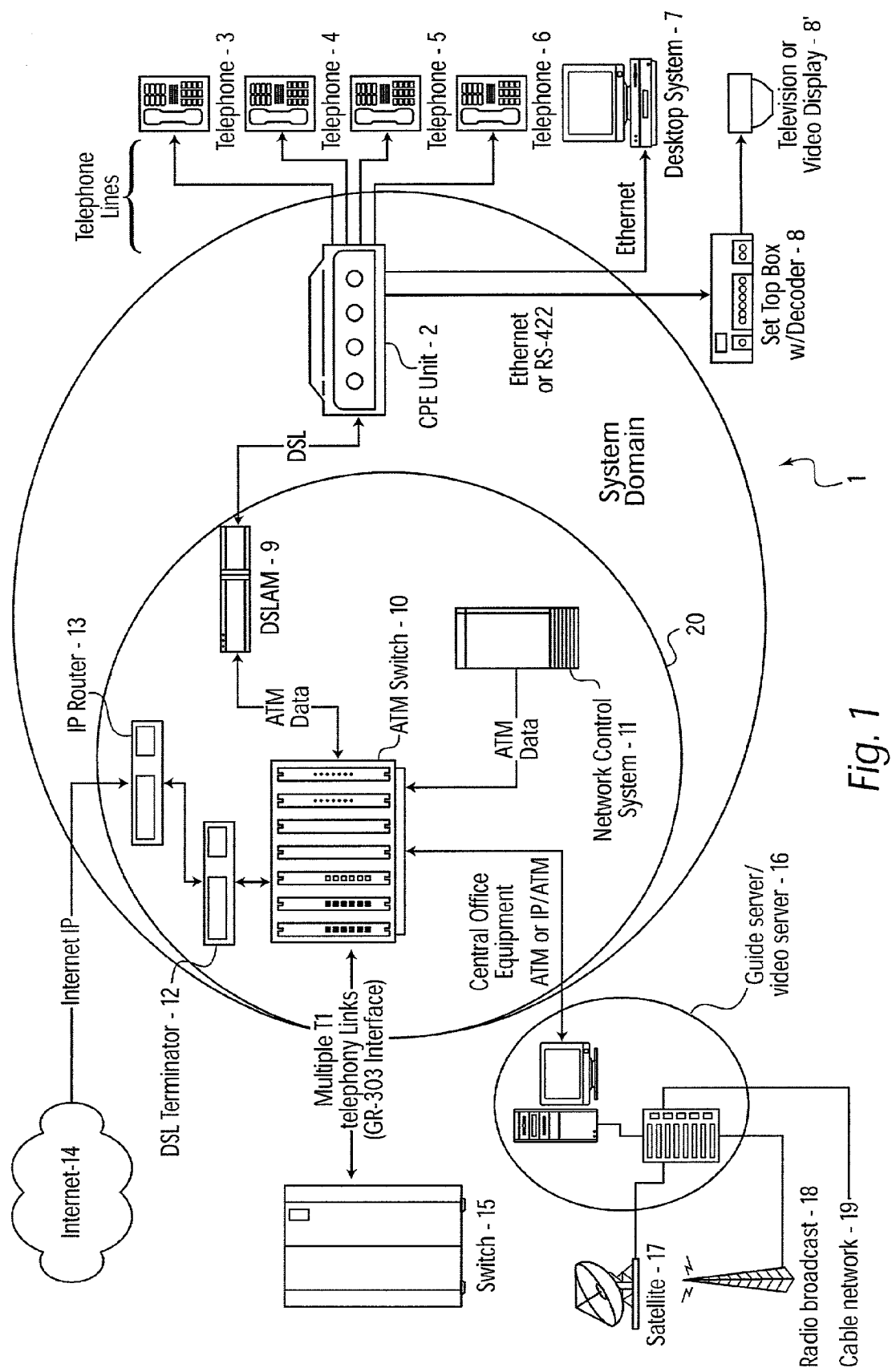
FIG. 1 is an exemplary digital subscriber line (DSL) system architecture showing a subscriber input stream from a plurality of sources, the architecture being employed in accordance with a receiver system of the present invention.

Referring now in specific detail to the drawings in which like reference numerals identify similar or identical elements throughout the several views, and initially to FIG. 1, a DSL system architecture 1 for integrating voice, data and video services is shown in an exemplary DSL environment for employing the present invention. The system block diagram 1 is composed of several functional blocks. The system domain is composed of Central Office (CO) Equipment 20 and Customer Premise Equipment (CPE) 2. The component blocks within the system domain and their respective interfaces are: customer premise equipment (CPE) 2, Digital Subscriber Line Access Multiplexer (DSLAM) 9, an ATM switch 10 and an internet protocol (IP) router 13 and ATM terminator 12. The ATM switch 10 is shown coupled to a program guide server/video server 16 to satellite 17, radio broadcast 18 or cable 19 networks. The ATM switch 10 is also coupled over the DSL terminator 12 and IP router 13 pair to receive Internet Protocol IP packet data from the Internet 14.

The current customer premise equipment (CPE) 2 includes a DSL modem unit 30 that interfaces with separate analog telephones 3-5 over a plain old telephone service (POTS), a 10Base-T Ethernet connection to a PC desktop system 7, and an Ethernet or RS-422 connection to a set-top box with a decoder 8 for connection to a television or video display 8'. From the customer's analog end, the CPE device 2 accepts the analog input from each of the telephones 3-5, converts the analog input to digital data, and packages the data into ATM packets (Voice over ATM), with each connection having a unique virtual channel identifier/virtual path identifier (VPI/VCI). Known to skilled artisans, ATM is a connection-oriented protocol, and, as such, there is a connection identifier in every cell header, which explicitly associates a cell with a given virtual channel on a physical link. The connection identifier includes two sub-fields, the virtual channel identifier (VCI) and the virtual path identifier (VPI). Together these identifiers are used at multiplexing, demultiplexing and switching a cell through the network. VCIs and VPIs are not addresses, but are explicitly assigned at each segment link between ATM nodes of a connection when a connection is established, and remain for the duration of the connection. When using the VCI/VPI, the ATM layer can asynchronously interleave (multiplex) cells from multiple connections.

The Ethernet data is also encapsulated into ATM cells with a unique VPI/VCI. The ATM cell stream is sent to the DSL modem of the CPE unit 2 to be modulated and delivered to the DSLAM unit 9. Going in the other direction, the DSL signal is received and demodulated by the DSL modem 30 in the customer premise equipment 2 and delivered to VPINCI detection processing. The ATM cell data with VPINCI matching that of the end user's telephone is then extracted and converted to analog POTS to be delivered to the telephone. The ATM cell data with VPI/VCI matching that of the end user's Ethernet is extracted and delivered to an Ethernet transceiver for delivery to the port.

The Digital Subscriber Line Access Multiplexer (DSLAM) 9 demodulates data from multiple DSL modems and concentrates the data onto the ATM backbone network for connection to the rest of the network. DSLAM 9 provides back-haul services for package, cell, and/or circuit based applications through concentration of the DSL lines onto ATM outputs to the ATM switch 10.

The ATM switch 10 is the backbone of the ATM network. The ATM switch 10 performs various functions in the network, including cell transport, multiplexing and concentration, traffic control and ATM-layer management. Of particular interest in the system domain 1, the ATM switch 10 provides for the cell routing and buffering in connection with the DSLAM 9 and the Internet gateway (Internet Protocol IP router 13 and DSL or ATM terminator 12), and T1 circuit emulation support in connection with the multiple telephony links switch 15. The ATM switch 10 may be coupled to a program guide server/video server 16 to connect and interface with satellite, radio broadcast or cable networks. The ATM switch 10 is also coupled over the ATM terminator 12 and IP router 13 pair to receive Internet Protocol IP packet data from the Internet 14.

NCS 11 provides the termination point for the signaling that controls the setting up and tearing down of virtual circuits based on users access rights and requests. In addition, NCS 11 also provides functions for permitting a customer to control the content flow, e.g., functions such as pause, stop, play, advance, reverse, etc. of the content may be controlled by a user through, for example, set top box 8, in much the same way as traditional VCR functionalities. NCS 11 also provides information on customer activity for billing purposes.

NCS 11 provides for address translation, demand assignment and call management functions and manages the DSL/ATM network including the origination and termination of phone calls and service requests and orders. NCS 11 is essentially the control entity communicating and translating control information between the class 5 PSTN switch 15 (using e.g., the GR-303 protocol) and the CPE 2. The network control system 11 is available for other functions such as downloading code to the CPE, and bandwidth and call management functions, as well as other service provisioning and setting up tasks.

NCS 11 may be setup to send, for example, videos from video server 16 to customers. The video data stream is sent from video server 16, located in the service provider's network, to CPE 2 on an ATM virtual circuit set up by NCS 11. The video leaves video server 16 and enters an ATM head-end network 1, enters DSLAM 9, and then is received at CPE 2. CPE 2 can send the video to the set top box 8, which includes a video decoder. The interface between CPE 2 and set top box 8 may include, e.g., 1394 cable, Ethernet link, coax cable, wireless, etc. This is the steady state condition of the system when a customer is viewing streaming content.

Alternately, streaming content may be received from an Internet source. A data stream may be transmitted over the Internet 14 through IP router 13 and into DSL terminator 12. Streaming data is packeted into cells and transported through ATM switch 10 to DSLAM and CPE 2. The data packets received from the Internet are TCP/IP based. Therefore, ATM and TCP/IP based systems may need different receiver configurations for terminating each protocol.

The streaming content will be sent from video server 16 or Internet 14 through head-end network 1. The streaming data will be separated into voice, data and streaming content between, for example, telephones 3-6, computer 7 and set top box 8, respectively. Streaming content in set top box 8 is received by receiver decoder architectures, which will be described with reference to FIGS. 2 and 3 below. These architectures depend on the source of the streaming content, e.g. from a native ATM network or from a TCP/IP based network.

Processing of a video stream received from a DSL network may be implemented with multiple architectures (depending on the location of the video stream decoder with respect to an access device). Additionally, depending on the layer in which the video streaming function is implemented, the overall system architecture and the elements in the receiver may be different which implies different architectures.

Figure 4:
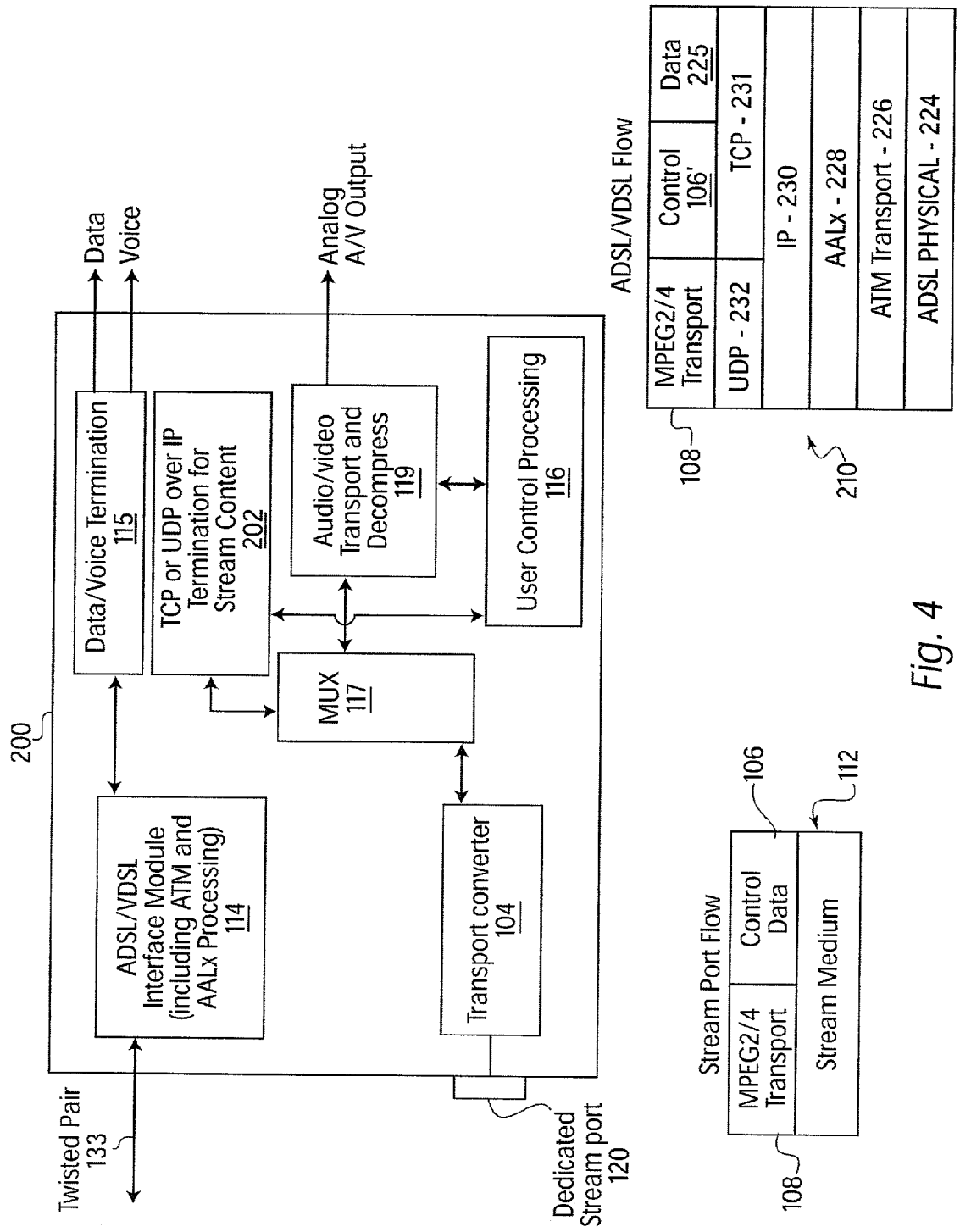
FIG. 4 is a schematic diagram of an illustrative video decoder architecture employed with a TCP/IP based content delivery system in accordance with the present invention.

The present invention provides illustrative receiver architectures for ATM (Layer 2) switching (FIG. 2) and for IP Layer (Layer 3) switching (FIG. 4). The architectures of the present invention are also suitable for stand-alone access devices or a device that exists as an end element in a home network (with data streamed through a dedicated stream Ethernet port). These access devices may include personal computers, televisions or the like.

Figure 2:
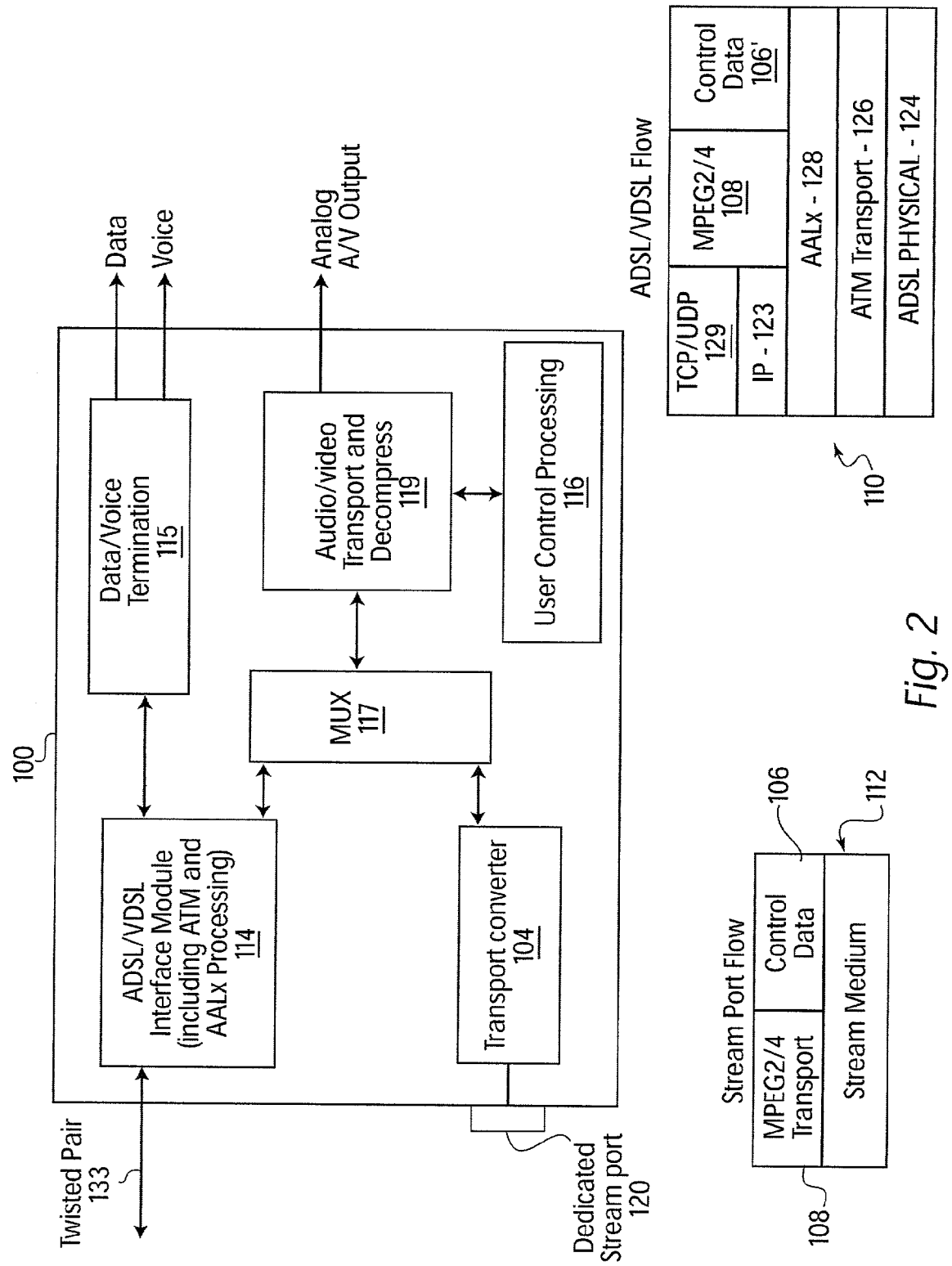
FIG. 2 is a schematic diagram of an illustrative video decoder architecture employed with a native asynchronous transfer mode (ATM) network for streaming content delivery in accordance with the present invention.

Referring to FIG. 2, a schematic diagram illustratively showing receiver architecture, herein after unit 100 for content delivered over an ATM layer (layer 2) in accordance with one embodiment of the present invention. Unit 100 may be disposed in a network termination device with an xDSL modem (e.g., in CPE 2 of FIG. 1) or in an home network with a stream Ethernet port dedicated for receiving streams or sending commands back through the network to accomplish interactivity. FIG. 2 shows an integrated unit combining the functionality of CPE 2 and a user termination device (e.g., a set top box 8). The content delivery for unit 100 is shown for the ATM layer.

Unit 100 includes a dedicated stream port 120, which interfaces with a transport converter 104. Transport converter 104 provides an interactive conversion interface between a network termination device (e.g., CPE 2) and a local network transport interface (e.g., a home network). The role of the transport converter 104 is to provide an interactive conversion interface between the access network termination (ATM in this case), which is received from head-end network 1 (see protocol stack 110) through port 120 and converted for transport over a local home network transport interface (see protocol stack 112). Protocol stacks 110 and 112 are shown for RJ45 connections; however, the present invention can be adapted and employed with, for example, 1394 or wireless connections.

Unit 100 (e.g. CPE 2) receives voice, data and streaming (audio or video content) that have been carried with different priorities over a public access network, such as a DSL network 1 with a twisted pair medium 133. The voice, data and streaming content protocols are terminated in the home ("voice" and "data" are distributed to other devices not shown in FIG. 2), and the streamed traffic is separated from the voice and data traffic. This is performed at the ADSL/VDSL network interface module 114. Module 114 performs ATM and ATM Adaptation Layer (AAL) processing.

Module 114 interfaces with a multiplexer 117 which distributes video data to a transport converter 104 and a data stream transport and decompressor 119. Decompressor 119 decompresses/decodes the audio/video stream and outputs the stream (e.g., "Analog A/V Output") to a device, such as a television set 8' (FIG. 1) or any other audio and/or display device. Decompressed/decoded video data is also transferred through multiplexer 117 to a transport converter 104.

The transport interface of transport converter 104 manages a control channel 106 and a data channel 108 in the home network in e.g., the Ethernet protocol. While the Ethernet protocol is an illustrative protocol for carriage of information into the home network, other protocols may be used as well to distribute streamed content over a home network. Data channel 108 is employed to distribute streaming content to one or more devices in a home network while control channel 106 is employed to send control signals to the components of the home network or back through head-end network 1.

In the home, it may be desirable to redistribute the streaming content or video (for example, to a TV set in another room). Unit 100 provides a control interface 116 for processing user control signals to permit user interaction with other video devices in the home network or servers/devices in the public network. Control signals generated through interface 116 are transmitted over control channel 106 and may be sent to a home network or routed back to head-end network 1 through twisted pair or port 120 via control channel 106'. Control data (in control channel 106') is routed through decompressor 119 and module 114 to rebuild the ADSL physical layer 124, the ATM transport layer 126 and the ATM adaptation layer (AAL) protocol AALX (e.g., AAL5) layer 128 in the protocol stack 112 to enable communication with head-end network 1. Channels 129 and 123 may be provided to support other protocols, for example, TCP/UDP (Transmission Control Protocol/User Datagram Protocol) and IP (Internet Protocol).

The video content is mapped onto the local or home network by employing transport converter 104. This enables a plurality of devices in the local or home network to concurrently display the video content and provides a way of sending control data from one device to another within the home network or to the headend network 1.

The mechanisms for redistributing content will depend of a plurality of factors. One factor is the type of network and/or protocol the content was carried over, for example, over a native ATM over DSL network (FIG. 2) or over an IP network (FIG. 4) and using, for example, an IEEE 1394 interface for local distribution. In any case, it is desirable to map the streamed audio/video content into the home network interface in a consistent manner. Another factor that determines redistribution is the hardware employed.

Figure 3:
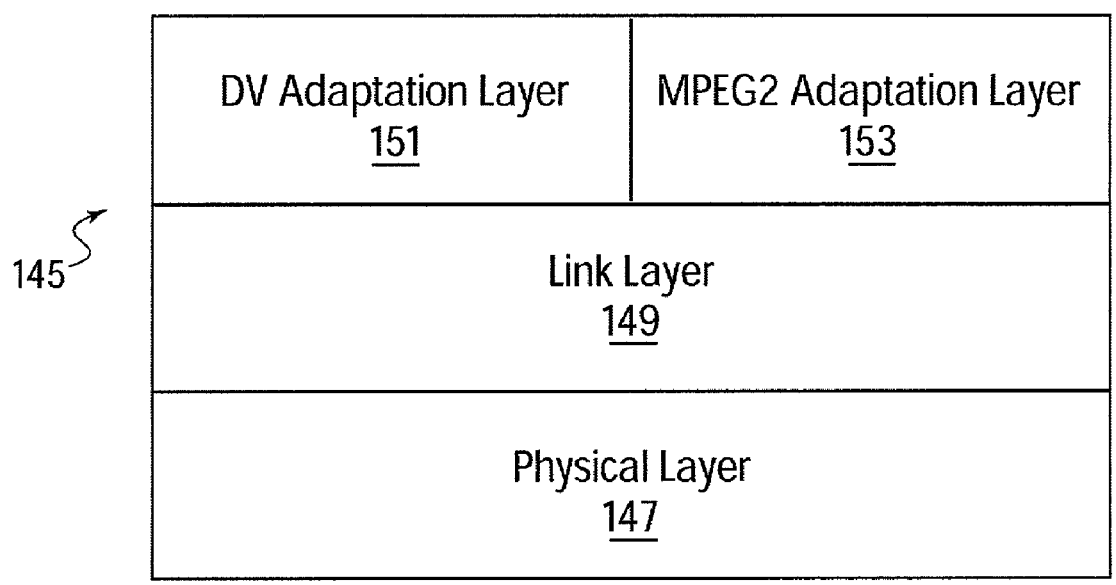
FIG. 3 is a schematic diagram of an alternate protocol stack received from a head-end network employing an IEEE 1394 interface in accordance with the present invention.

Referring to FIG. 3, a protocol stack 145 is shown for stream port flow for an IEEE 1394 interface. Hardware of unit 200 may be adapted accordingly to terminate each layer of the protocol to convert the video stream (using a suitably programmed transport converter 104) to a format that is usable by a home or local network. Stack 145 includes a physical layer 147, a link layer 149, a DV (a light decompression standard) adaptation layer 151 and a streaming data (e.g., MPEG ¾) adaptation layer 153. It is to be understood that other hardware and protocols may be employed in accordance with the present invention.

Referring to FIG. 4, a schematic diagram illustratively showing receiver architecture, herein after unit 200 for content delivered over a TCP/IP based network (layer 3) in accordance with another embodiment of the present invention. Unit 200 may be disposed in a network termination device with an xDSL modem (e.g., in CPE 2 of FIG. 1) or in an home network with a stream (e.g., Ethernet) port 120 dedicated for receiving streams or sending commands back through the network to accomplish interactivity. FIG. 4 shows an integrated unit combining the functionality of CPE 2 and a user termination device (e.g., a set top box 8). The content delivery for unit 200 is shown for the TCP/IP layer.

Unit 200 includes a dedicated stream port 120, which interfaces with a transport converter 104. Transport converter 104 provides an interactive conversion interface between a network termination device (e.g., CPE 2) and a local network transport interface (e.g., a home network). The role of the transport converter 104 is to provide an interactive conversion interface between the access network termination (TCP/IP in this case), which is received from head-end network 1 (see protocol stack 210) and converted for transport over a local home network transport interface (see protocol stack 112). Protocol stacks 210 and 112 are shown illustratively for RJ45 connections; however, the present invention can be adapted and employed with, for example, 1394 or wireless connections.

The voice, data and streaming content protocols are terminated in the home (voice and data are distributed to other services not shown in FIG. 4), and the streamed traffic is separated from the voice and data traffic. This is performed at the ADSL/VDSL network interface module 114. Module 114 performs ATM and ATM Adaptation Layer (AAL) processing. Unit 200 shows an additional TCP or UDP over IP layer termination 202 in the xDSL chain before data is presented to the decoding engine (module 119) in the primary ADSL path. Module 114 also performs the ATM and AAL layer processing. Processing flow protocol output from module 114 is illustratively shown, for this configuration, as protocol stack 112.

Module 114 interfaces with a multiplexer 117 which distributes video data to a transport converter 104 and a data stream transport and decompressor 119. Decompressor 119 decompresses/decodes the audio/video stream and outputs the stream (A/V output) to a device, such as a television set 8' (FIG. 1) or any other audio and/or display device. Decompressed/decoded video data is also transferred through multiplexer 117 to a transport converter 104.

The transport interface of transport converter 104 manages control data 106 and data transport channel 108 (e.g. streaming video) in the home network using an illustrative Ethernet protocol. Other protocols may be used as well to manage the control and data traffic from other devices in the home network and the CPE 2 unit. Data transport channel 108 is employed to distribute streaming content to one of more devices of the home network or back through head-end network 1.

In the home, it may be desirable to redistribute the streaming content or video (for example, to a TV set in another room). Unit 200 provides a control interface 116 for processing user control signals to permit user interaction with other video devices in the home network or servers/devices in the public network. Control signals generated through interface 116 are transmitted over control channel 106 and may be sent to the home network through port 120 or routed back to head-end network 1 through twisted pair 133. Control data (in control channel 106') is routed through module 114 to be transported over the ADSUVDSL physical layer 224, the ATM transport layer 226, the ATM adaptation layer (AAL) 228, the IP layer 230 to enable communication with head-end network 1. Another protocol layer may include a TCP layer 231 and a UDP layer 232. Channels 106', 108 and 225 may be provided to support control information (106'), streaming content (108), and data (225).

As in FIG. 2, the video content is mapped onto the local or home network by employing transport converter 104. This enables a plurality of devices in the local or home network to concurrently display the video content and provides a way of sending control data from one device to another within the home network or to the head-end network 1.

Figure 5:
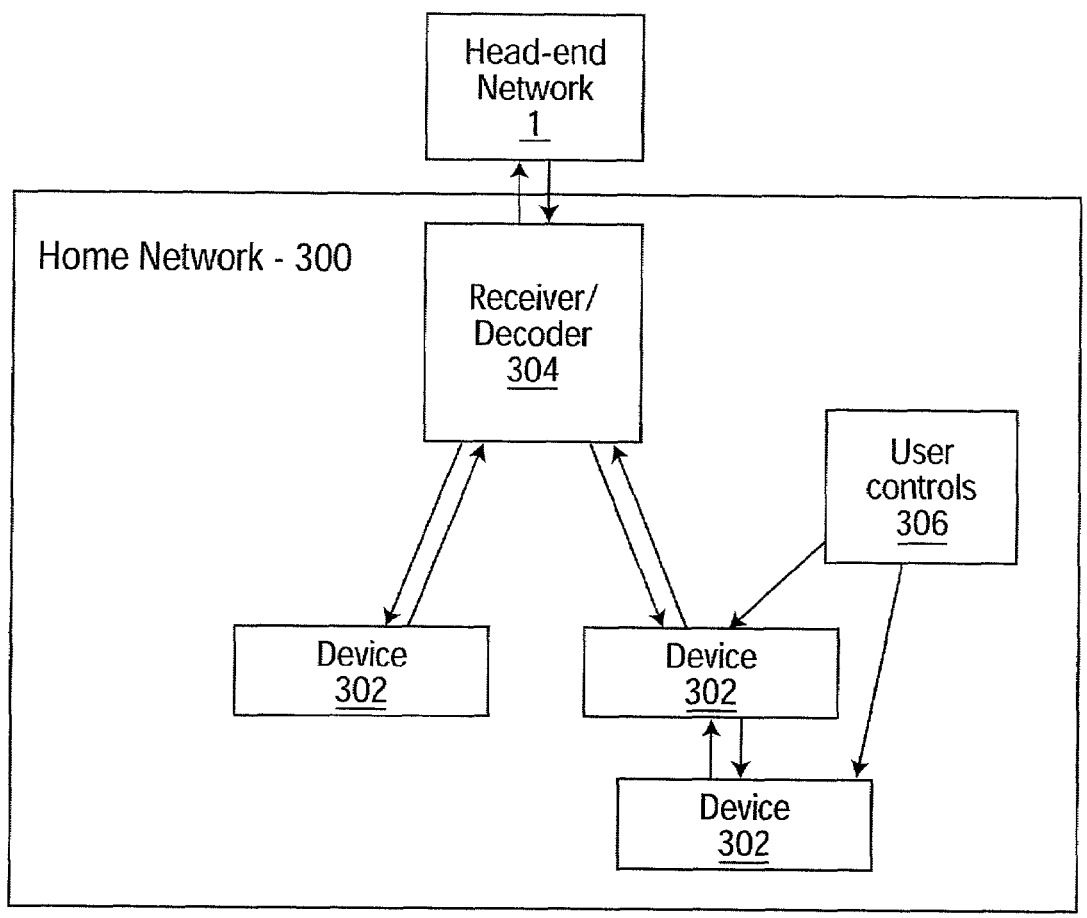
FIG. 5 is a schematic block diagram of a home network employing streaming data content received over a head-end network in accordance with the present invention.

Referring to FIG. 5, an illustrative schematic diagram is shown for a home network 300, which permits devices 302 to receive a data stream from head-end network 1. A decoder/receiver 304 preferably includes unit 100 or unit 200, as described above. Devices 302 may include television sets, computers, displays or any other device, which may employ a data stream. Decoder/receiver 304 includes a dedicated port (e.g., port 120 in FIGS. 2 and 4), which bypasses unit 304 and permits, for example, a video stream to by transported to devices 302 in home network 300. User controls 306 may be employed to control the data stream (e.g., pause, stop, fast forward rewind, etc.), to control devices 302 or to interface with head-end network 1. Control signals can be transferred through home network 300 or head-end network 1 to provide interactivity for a user with a video-on-demand or other on-demand service.

Having described preferred embodiments for video receiver architecture for digital subscriber line networks (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

What is claimed is:

1. A customer-side receiver unit, comprising:
a CPE (customer premises equipment) unit provided at a customer premises to enable access to an access network over a communications channel, the CPE unit comprising:
a network interface module which is coupled to the communications channel to receive multiplexed information in the form of one or more of voice, data and streaming content from the access network, and which separates the streaming content from the voice information and data information;
a transport layer termination module coupled to the network interface module, which terminates layers of protocol associated with the information;
a transport converter which converts streaming content to a format usable by a local network; and
a dedicated stream port coupled to the transport converter to output the streaming content to the local network, wherein the dedicated stream port is configured to transmit control data between devices that receive the streaming content from the dedicated stream port.

2. The receiver unit, as recited in claim 1, wherein the access network includes an asynchronous transfer mode (ATM) network and wherein the network interface module includes ATM layer protocol termination.

3. The receiver unit, as recited in claim 1, wherein the access network provides TCP/IP based protocols and wherein the network interface module includes TCP/IP layer protocol termination.

4. The receiver unit, as recited in claim 1, further comprising a user control processor, which processes user control signals for controlling local network devices.

5. The receiver unit, as recited in claim 4, wherein the transport converter provides a control channel to transport data to and from the local network to control and communicate with network devices.

6. The receiver unit, as recited in claim 4, wherein the user control signals are transmitted to the access network for interaction with external devices and services.

7. The receiver unit, as recited in claim 1, wherein the transport converter supports IEEE 1394 based protocols and the dedicated stream port is a 1394 interface.

8. The receiver unit, as recited in claim 1, further comprising a twisted pair interface coupled to the network interface module for receiving at least one of voice, data and streaming content from a digital subscriber line based head-end network.

9. The receiver unit, as recited in claim 1, further comprising an audio-video transport and decompression module for decompressing the streaming content and outputting decompressed streaming content to an output device.

10. The receiver unit, as recited in claim 1, further comprising a set top box for receiving user control signals for controlling network devices.

11. The receiver unit, as recited in claim 1, wherein the local network is a home network.

12. A method for providing a data stream to a plurality of devices in a local network, comprising the steps of:
connecting a CPE (customer premises equipment) unit to a public access network over a communications channel;
the CPE unit receiving multiplexed information in the form of one or more of voice, data and streaming content from the access network and separating the steaming content from the voice information and data information;
the CPE unit converting the streaming content to a format compatible with a local network;
the CPE unit distributing the steaming content to a plurality of devices on the local network over a dedicated stream port of the CPE unit for simultaneous use by the plurality of devices; and
the CPE unit transmitting, through the dedicated stream port, control data between devices that receive the streaming content from the dedicated stream port.

13. The method, as recited in claim 12, wherein the access network includes an asynchronous transfer mode (ATM) network and wherein receiving multiplexed information includes the CPE unit terminating the ATM layer protocol.

14. The method, as recited in claim 12, wherein the access network provides TCP/IP based protocols and wherein receiving multiplexed information includes the CPE unit terminating the TCP/IP layer protocol.

15. The method, as recited in claim 12, wherein the access network provides IEEE 1394 based protocols and wherein receiving multiplexed information includes the CPE unit terminating the 1394 layer protocols.

16. The method, as recited in claim 12, further comprising the CPE unit processing user control signals for controlling local network devices.

17. The meted, as recited in claim 16, further comprising the CPE unit transporting the control signals to and from the local network to control and communicate with network devices.

18. The method, as recited in claim 16, further comprising controlling network devices on the access network by the user control signals.

19. The method, as recited in claim 12, further comprising the CPE unit decompressing the streaming content and outputting decompressed streaming content to an output device.

* * * * *